(12) United States Patent
Kydles et al.

(10) Patent No.: US 8,856,595 B2
(45) Date of Patent: Oct. 7, 2014

(54) METHOD FOR VERIFYING AN APPLICATION PROGRAM IN A FAILSAFE PROGRAMMABLE LOGIC CONTROLLER, AND PROGRAMMABLE LOGIC CONTROLLER FOR PERFORMING THE METHOD

(75) Inventors: Jens Kydles, Nürnberg (DE); Markus Walter, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 357 days.

(21) Appl. No.: 13/267,035

(22) Filed: Oct. 6, 2011

(65) Prior Publication Data

US 2012/0266022 A1    Oct. 18, 2012

(30) Foreign Application Priority Data

Oct. 6, 2010    (EP) .................................... 10186727

(51) Int. Cl.
    G06F 11/00    (2006.01)
    G06F 11/07    (2006.01)
    G06F 11/10    (2006.01)
    G06F 11/16    (2006.01)

(52) U.S. Cl.
    CPC ........ *G06F 11/0796* (2013.01); *G06F 11/1004* (2013.01); *G06F 2201/83* (2013.01); *G06F 11/167* (2013.01)
    USPC .......................................................... 714/32

(58) Field of Classification Search
    USPC ..................................................... 714/32, 45
    See application file for complete search history.

(56) References Cited

U.S. PATENT DOCUMENTS

| | | | |
|---|---|---|---|
| 7,139,820 B1 * | 11/2006 | O'Toole et al. ................ 709/223 |
| 2003/0093719 A1 | 5/2003 | Ali-Santosa et al. | |
| 2004/0250167 A1 | 12/2004 | Sato et al. | |
| 2005/0193378 A1 * | 9/2005 | Breault .......................... 717/140 |
| 2005/0229004 A1 * | 10/2005 | Callaghan ...................... 713/185 |
| 2006/0200736 A1 * | 9/2006 | Smit et al. ...................... 715/500 |
| 2008/0086652 A1 | 4/2008 | Krieger et al. | |
| 2008/0126882 A1 * | 5/2008 | Fulton et al. .................... 714/48 |
| 2012/0017235 A1 * | 1/2012 | Kudelski et al. ................ 725/31 |

* cited by examiner

*Primary Examiner* — Yair Leibovich

(74) *Attorney, Agent, or Firm* — Cozen O'Connor

(57) ABSTRACT

A method and a programmable logic controller (SPS) for verifying an application program in a failsafe programmable logic controller, wherein a signature (desired value) is generated using program modules or a complete application program when creating a program, and a copy of the signature is stored in the programmable logic controller and in an external component, respectively. Before the safety-oriented application program is started, the copy of the signature stored by the programmable logic controller is transmitted to the external component and is compared with the copy in the external component. In a further comparison, a signature (actual value) is generated using the content of the main memory of the programmable logic controller and using the actually loaded application program and is then compared with the local copy of the desired value of the signature. Starting of the actual application program is enabled only when both comparisons are positive.

9 Claims, 2 Drawing Sheets

METHOD FOR VERIFYING AN APPLICATION PROGRAM IN A FAILSAFE PROGRAMMABLE LOGIC CONTROLLER, AND PROGRAMMABLE LOGIC CONTROLLER FOR PERFORMING THE METHOD

BACKGROUND OF THE INVENTION

1. Field of the Invention

The invention relates to a method for verifying an application program in a failsafe programmable logic controller and to a programmable logic controller.

2. Description of the Related Art

Programmable logic controllers are used in all areas of automation technology. Increased demands are imposed on operational safety in those applications in which failure of the programmable logic controller would have serious consequences, such as damage to machines and systems or even personal injuries. The programmable logic controllers used in such scenarios are provided, for this purpose, with measures that lead to increased failure safety or operational safety, such as by a redundant design or better error detection. Such programmable logic controllers are also referred to as "safety-oriented", "failsafe", "fault-tolerant", etc. Criteria for the required functional safety are also laid down in numerous standards, for example, in the European standard EN 61508.

For the failsafe "safety-oriented" programmable logic controllers, a user, for example, must be able to reliably check that the correct safety program has been loaded into the controller, i.e., it must be possible to check that the application program which has been loaded into the main memory of the programmable controller is that program which is intended for the specific task and is not, for instance, another application program or an application program with the wrong version number (version). Here, it must also be ensured that not only the "correct" application program is or has been loaded into the main memory but also that the program is executed and not, for instance, programs or program modules (functional modules) of another application program which was previously executed, for example. The situation may thus arise in which a complete "incorrect" or obsolete application program is executed or else only an individual functional module from a previously executed application program is left over and is then executed in an unwanted manner. The situation may likewise arise in which individual functional modules have been erased or damaged, with the result that the present application program is incomplete or unusable.

In order to exclude such errors, different procedures are customary when "loading" the failsafe programmable logic controllers. It is thus ensured, on the one hand, that a load memory, i.e., a memory card, a hard disk or another mass memory of the programmable logic controller, for example, contains the "correct" application program and thus the "correct" functional modules or program modules by virtue of the programmable logic controller determining a program identification of the application program or the program modules or functional modules in the load memory. This means that, for example, the function names and the respective version number (version) and possibly also the order (arrangement) of these "routines" in the load memory are determined as the program identification. This information is transmitted to an external component, usually the creation system ("engineering system"), and is compared there with a desired value that was determined and stored when creating the application program. In the event of a positive comparison, a confirmation message can be transmitted from the external component to the programmable logic controller, as a result of which the execution of the application program is ultimately enabled. This procedure ensures that the correct application program with all of its associated functional modules and program modules is present in the load memory, to be precise also in the correct order and in the correct version number (version).

Nevertheless, the situation may occur in which parts (fragments) of another application program are still present in the main memory of the programmable logic controller after the application program determined in this manner has been loaded and may thus be executed. As a result, loading regulations must be complied with, i.e., say measures must be taken that ensure program fragments or the like are removed from the main memory before the "correct" application program is loaded. This may mean, for example, or that the programmable logic controller is "reset", that the entire main memory is filled with standard values (for example, logic "0" or logic "1" in every memory cell).

In particular, heeding the prescribed loading regulations constitutes a mounting problem in practice, because these loading regulations differ in different programmable logic controllers ("target systems", "targets") used, sometimes to a very considerable extent. This means that, for example, a simple programmable logic controller having proprietary hardware, which has only a memory card as the load memory and only a contiguous main memory, is loaded and started using different loading regulations from those for a PC-based system, for example, in which the programmable logic controller is operated in a real-time operating system in a parallel manner to a Windows-oriented operating system (for example, Microsoft Windows). Although it is ensured that the "correct" application program has actually been loaded into the main memory and there are additionally no other program parts or the like in the main memory when the respectively valid loading regulations are complied with, errors can easily occur because of the different loading regulations for different systems, which errors are not detected or are often detected only with difficulty and result in the proper state not necessarily having been reached.

Another disadvantage is that, in addition to the necessary knowledge of the loading regulations and the heeding of the latter, accurate knowledge or analysis of the respective programmable logic controller and its memory structures is also necessary.

SUMMARY OF THE INVENTION

It is therefore an object of the present invention to simplify the loading process in safety-oriented programmable logic controllers.

It is also an object of the present invention to detect erroneous content of the main memory of the programmable logic controller, which content results from erroneous performance of a loading procedure (loading regulations), for example.

These and other objects and advantages are achieved in accordance with the present invention by a method and a programmable logic controller in which the application program in the load memory is not checked, or not only the application program in the load memory is checked, for its correspondence to the desired state but the content of the main memory is checked for correspondence to the desired state (desired value) after the loading process, with the result that undesirable states which arose as a result of the loading regulations not being followed or as a result of errors when applying the loading regulations are reliably detected. Another concept of the present invention is that this check and thus the comparison between the actual value and a desired value is performed using the affected programmable logic controller itself.

In accordance with the invention, the method verifies an application program in a safety-oriented programmable logic controller, where an application program consisting of a number of program modules is transmitted from a load memory to a main memory. Here, a signature is formed, as a desired value, using a plurality of the program modules when creating the application program, where a first copy of this signature is transmitted to the failsafe programmable logic controller and is stored in the failsafe programmable logic controller. A second copy of this signature is stored in an external component. At least after the application program and the first copy of the signature have been transmitted to the failsafe programmable logic controller, the first copy of the signature is transmitted to the external component ("read back") and is compared with the second copy of the signature by a second comparison. Furthermore, a second signature is determined, as an actual value, from the application program in the main memory, or from a plurality of the program modules transmitted to the main memory, by a management entity of the failsafe programmable logic controller, after which this second signature which has been determined is compared with the first copy of the signature by a first comparison that is performed by the programmable logic controller. The programmable logic controller is changed to a safe operating state in the event of a discrepancy in one of the comparisons.

The method in accordance with the invention ensures that the application program in the main memory of the programmable logic controller corresponds exactly to the application program determined during creation (programming). The practice of reading back the signature stored in the programmable logic controller and the comparison with the signature stored as a desired value detect the error that occurs when no data at all are transmitted to the programmable logic controller (neither a new application program nor a copy of the desired value of the signature) but rather an "old" application program with the matching signature is retained in the programmable logic controller. In such a case, it would otherwise be possible to start the programmable logic controller with an "undesirable" program.

The object is also achieved by a programmable logic controller for use in a safety-oriented application, where the programmable logic controller is configured to perform one of the abovementioned methods, and is equipped with a management entity for determining an actual value of a signature of the application program in the main memory of the programmable logic controller and with a comparison device for comparing the determined actual value with a second signature which is stored as a desired value. The programmable logic controller is also set up such that a safe operating state is activated in the event of a negative result of the comparison. Such a programmable logic controller makes it possible to perform the abovementioned method, with the result that the advantages correlated therewith can be achieved.

An emergency stop of the programmable logic controller, for example, can be strived for as the safe operating state, where the electrical outputs of the programmable logic controller are able to be changed to states predefined for this purpose in one advantageous embodiment.

The determination of the signature (actual value) and the comparison with the desired value are advantageously performed after the program has been loaded into the main memory, i.e., before the program is started for the first time, with the result that execution of the erroneous application program can be prevented from the outset in the event of an error. In one alternative embodiment, all program modules that are loaded into the main memory are used to create the signature (actual value), with the result that there is no need to check the entire content of the main memory if the continuous, dynamic creation of the signature is started after each restart of the programmable logic controller or "overall reset" of the main memory.

In addition, the signature (actual value) determined can also be transmitted to the external component, for example, an engineering system, where a further comparison with a signature stored in the external component as a desired value or the copy of the signature is performed, operation of the application program being enabled only in the event of a positive comparison, for example, by transmitting an enable message to the programmable logic controller. The comparison carried out by the programmable logic controller can thus be checked or supplemented.

The signature used as a desired value or the signatures used as the first and second desired values is/are advantageously determined and stored while creating the application program, a check value, for example, Cyclic Redundancy Check (CRC) value, a hash value, a checksum or a "fingerprint", which is characteristic of the content of the respective functional modules, program routines etc. advantageously being formed instead of a program identification which is primarily based on function and file names and their version numbers. Here, the check values or signatures of the individual program parts, functional modules or the like can advantageously be combined or calculated with one another to form a total value, for example by means of an XOR function (XOR=exclusive OR function at the bit level). It is thus possible to reliably detect content-related errors and structural faults, the structural faults being able to be detected, in particular, even when the order of the individual functional blocks and program modules influences the signature value.

The presence of unwanted program modules or program fragments in the main memory can be reliably detected if the signature used as the actual value is formed from all program modules ("code sequences") present in the main memory and is compared with the desired value of the signature in the load memory when the controller is started.

The present method also makes it possible to determine subsequent changes or corruption of the content of the main memory or of that main memory area in which the executable application program is stored by repeatedly redetermining the actual value of the signature during ongoing operation of the programmable logic controller and comparing the actual value again with the desired value or values again. Such repeated execution can also occur, for example, in breaks or in those operating cycles in which the microprocessor of the programmable logic controller is not completely used by the application program alone.

A creation system or a development system that was used to create the application program and thus also to create the desired value of the signature is primarily possible as the external component used to carry out the second comparison. However, the functionality that performs the "external" comparison can also be moved to another component, such as a safety server that manages the order of the signatures of all safety-oriented programs of an automation system. In particular, a "start-up server" comes into consideration for this purpose, such a server being able to supply many or all of the programmable logic controllers of an automation arrangement with application programs.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment of the method according to the invention is explained below using the drawing. The exemplary embodiment is simultaneously used to explain a programmable logic controller according to the invention, in which.

DETAILED DESCRIPTION OF THE PRESENTLY PREFERRED EMBODIMENTS

Figure 1:
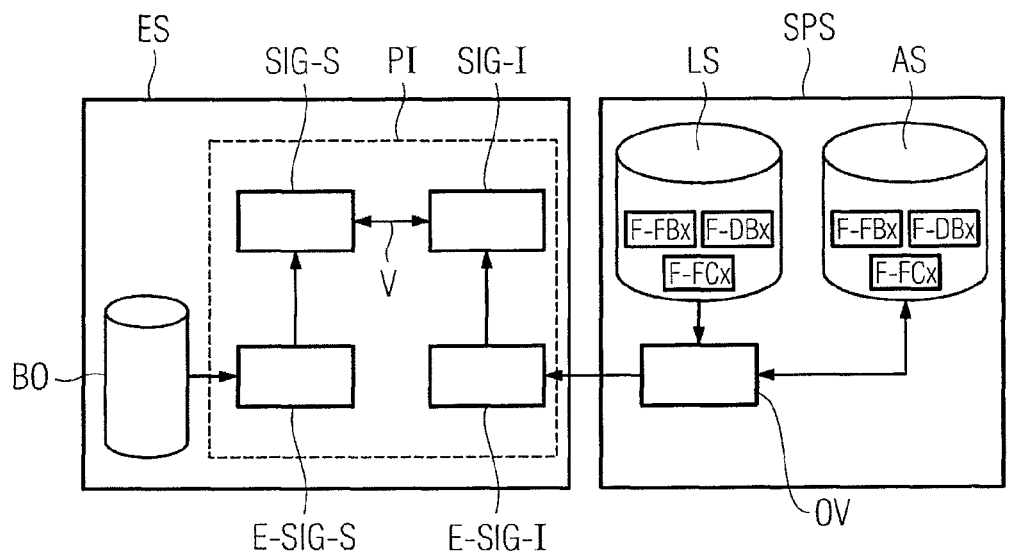
FIG. 1 shows a schematic illustration of those components of a conventional programmable logic controller and of a creation system/engineering system for performing the method in accordance with the invention.

FIG. 1 schematically shows an arrangement consisting of a development system ES (also called "creation system", "programming system" or "engineering system") and a programmable logic controller SPS which are linked to one another via a data link (not illustrated). This arrangement is intended to be used to explain a method in accordance with the prior art. In this case, it is assumed that an application program consisting of a multiplicity of program modules F-FBx, F-DBx, F-FCx (often also referred to as "functions", "routines", "functional blocks" or the like) has been created. This application program is stored in a memory BO (module folder) in the development system ES. After this application program has been completed, the development system ES creates and stores a signature SIG-S as a desired value using a function E-SIG-S (creation of the signature desired value) which can be executed there. Here, this signature SIG-S is a "program identification", i.e., it is a check value which has been created from the names and version names of the files of the application program or of the program modules F-FBx, F-DBx, F-FCx of the application program. In order to execute the application program on the failsafe programmable logic controller SPS, the application program is transmitted to the load memory LS of the programmable logic controller SPS; the load memory LS may be, for example, an exchangeable memory card ("flash" card or the like), a hard disk or another mass memory.

In order to be able to execute the application program, it must be transmitted to the main memory AS. For this purpose, the object management means OV of the programmable logic controller SPS determines information, for example, object names, function names, file names or version numbers, relating to the application program or the objects, routines and program modules F-FBx, F-DBx, F-FCx that form the application program in the load memory LS and also transmits this information to the development system ES. There, a function E-SIG-I (creation of the signature actual value), which may also be identical to the function E-SIG-S in one advantageous refinement, creates the actual value of a signature SIG-I from this information. The desired value SIG-S and the actual value SIG-I are then compared using a comparison V, where a positive acknowledgement message is transmitted to an object management device OV of the programmable logic controller SPS following a match. Before, during or after this comparison, the programmable logic controller SPS executes a sequence of loading instructions or loading regulations, which ensures that the main memory AS is completely erased, with the result that no fragments of previously executed application programs remain there.

According to the loading regulations, the application program which has been enabled using the positive acknowledgement message and the program modules forming the application program are now loaded into the main memory AS and are executed, where the program is naturally prevented from being started in the event of a negative acknowledgement message. In such a case, outputs (not illustrated) of the programmable logic controller SPS are changed to a defined state or are switched off, for example. Here, the "safe operating state" can be defined separately for each programmable logic controller SPS or each application. The loading regulations may also comprise operating instructions which ensure that the application program is transmitted to the main memory completely and correctly, for example by means of so-called "control reading" ("verify").

For the exemplary embodiment of the prior art depicted in FIG. 1, a simple architecture which can be started using simple loading regulations was chosen for reasons of clarity. In practice, more complex architectures which may differ considerably from one another depending on the specific situation and require complex and often very different loading regulations are generally used. Here, the execution of the incorrect loading regulations, i.e., the loading regulations that do not suit the specific configuration, may lead to undesirable results which additionally are not necessarily detected.

The functions E-SIG-S and E-SIG-I and the device for performing the comparison V may be combined in a software module PI (program identification); a corresponding situation applies to the analogous functions E-SIG-S and E-SIG-I2 and the device for carrying out the comparison V2 in FIG. 2 discussed below.

The method according to the invention is explained below using FIG. 2, in which case those components, devices and functions whose designation or reference symbol is already known from FIG. 1 are not described again.

Figure 2:
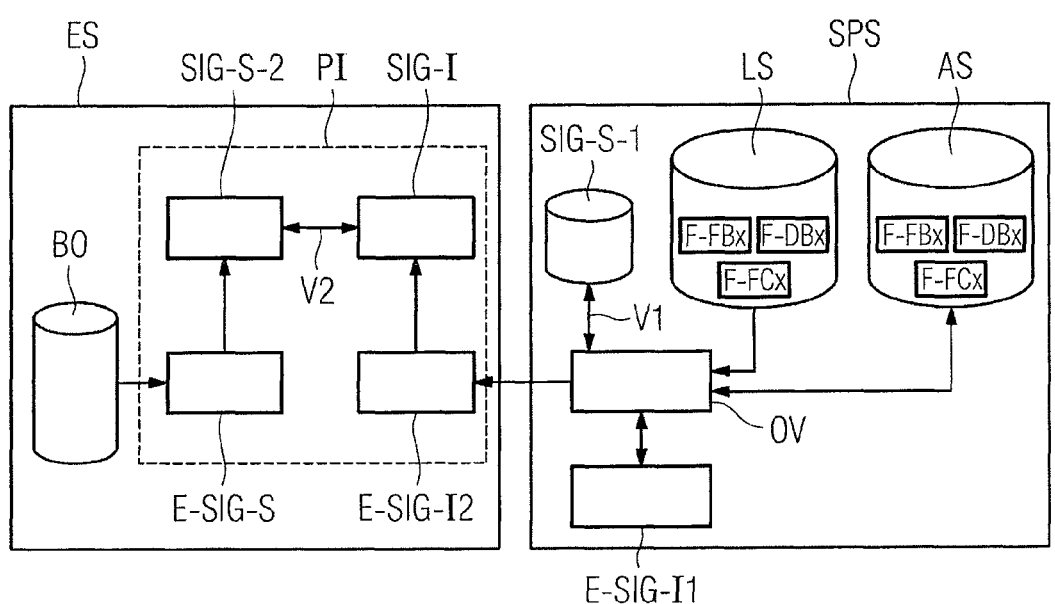
FIG. 2 shows a schematic block diagram of an arrangement which is set up to perform the method in accordance with the invention.

In terms of the hardware, the architecture shown in FIG. 2 corresponds to the situation explained using FIG. 1 (prior art). Following the creation of an application program that is again present in the memory BO of the development system ES, a function E-SIG-S, in this case, also generates a signature (desired value) using the application program or the program modules F-FBx, F-DBx, F-FCx of the application program. However, a first copy SIG-S-1 of this signature is now stored in the programmable logic controller SPS, storage being able to be effected either together with the application program in the load memory LS or else at a location (storage device) of the programmable logic controller SPS that differs from the load memory LS. In addition, a second copy SIG-S-2 is stored in a memory of the development system ES.

In the following explanation, it is assumed below that the application program is present in the load memory LS and the first copy of the signature SIG-S-1 is stored in a second memory of the programmable logic controller SPS that differs from the load memory LS. This second memory may advantageously be a smart card that was inserted, as a "start key" into a reader of the programmable logic controller SPS, with the result that the information stored there, in particular the first copy of the signature SIG-S-1, can be read by an object management device OV. In order to prepare the program start, the object management device OV implements loading regulations that result in the main memory AS being erased, and in the application program and thus the program modules then being transmitted from the load memory to the main memory AS, after which the safety check is performed. The loading regulations may be advantageously permanently stored in a memory of the programmable logic controller SPS.

The safety check involves calling a function E-SIG-I1, as a result of which the SPS and the function E-SIG-I1 present there create a signature (program signature, CRC value or "fingerprint") using the content of the main memory AS, this actual value being compared, by a comparison V1, with the signature SIG-S-1 stored as a desired value. Alternatively, each program block or the like, which is transmitted to the main memory AS, can also contribute to forming the signature, with the result that "screening" of the main memory is remissible and is replaced with the successive checking of the program modules that have been loaded and erased (unloaded) in the sense of "flow control".

If the comparison V1 is positive, execution of the application program in the main memory AS is enabled. In the event of a negative comparison, the programmable logic controller SPS is changed to a safe operating state which has already been explained using the prior art (FIG. 1). The comparison results can be evaluated by a routine of the application program itself. Here, the application program should be configured such that this routine is executed before safety-critical instructions are performed. Alternatively, such tasks could also be performed by "firmware".

Furthermore, a second comparison V2 is performed before the application program is started, i.e., before, during or after performing the first comparison V1, for which purpose information is transmitted from the programmable logic controller SPS to the development system ES. This information includes that copy of the signature (desired value) SIG-S-1 which is stored by the programmable logic controller and is compared, by a comparison V2, with a second copy SIG-S-2 (second copy of the desired value) stored by the development system ES. In the event of a positive comparison, a corresponding positive acknowledgement message is sent to the programmable logic controller SPS, this message, together with the positive result of the first comparison V1, enabling the application program present in the main memory AS, as a result of which program execution can start. It goes without saying that, in the event of a negative second comparison V2, a negative acknowledgement message is sent to the programmable logic controller SPS, as a result of which the safe operating state which has already been described is initiated.

In one advantageous embodiment, the signature ("actual value") which has already been generated by the function E-SIG-I1 is additionally transmitted to the development system ES or to another external component, with the result that said signature can be directly compared, by a further second comparison V2, with the second copy SIG-S-2 stored there.

Whereas the method in accordance with to the invention can be used to ensure that the application program has been correctly transmitted to the main memory AS and the necessary loading regulations have also been successfully and correctly applied without having to know or check the specific architecture and the specific loading regulations, it can furthermore also be ensured that the "correct" application program for the present situation is also present in the load memory LS, with the result that it is possible to prevent operation of the programmable logic controller SPS with an application program which, although also valid in principle, is intended for another application.

Figure 3:
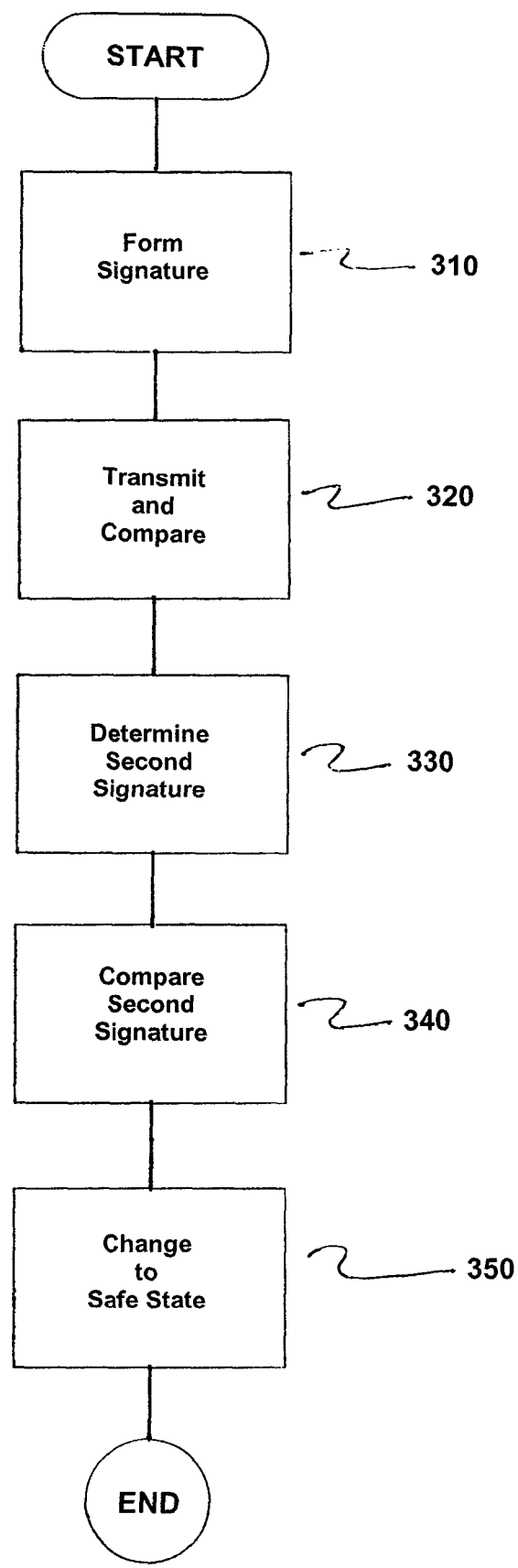
FIG. 3 is a flow chart of the method in accordance with an embodiment of the invention.

FIG. 3 is a flowchart of a method for verifying an application program in a failsafe programmable logic controller, where the application program consists of a plurality of program modules transmitted from a load memory to a main memory. The method comprises forming, as a desired value, a signature using either the application program or the plurality of the program modules when creating the application program, as indicated in step 310. Here, a first copy of the formed signature is transmitted to the failsafe programmable logic controller and is stored in the failsafe programmable logic controller, and a second copy of the formed signature is stored in an external component.

Next, the first copy of the formed signature is transmitted to the external component and the transmitted first copy of the formed signature is compared with the second copy of the formed signature by a second comparison after the application program and/or the first copy of the formed signature is transmitted to the failsafe programmable logic controller, as indicated in step 320.

A second signature is now determined as an actual value from either the application program in the main memory or the plurality of the program modules transmitted to the main memory by a management entity of the failsafe programmable logic controller, as indicated in step 330.

Next, the determined second signature is compared with the first copy of the formed signature by a first comparison of the programmable logic controller, as indicated in step 340.

The programmable logic controller is then changed to a safe operating state in an event of a discrepancy in the first comparison and/or a discrepancy in the second comparison, as indicated in step 350.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for verifying an application program in a failsafe programmable logic controller, the application program consisting of a plurality of program modules transmitted from a load memory to a main memory, the method comprising:

forming, as a desired value, a signature using one of the application program and the plurality of the program modules when creating the application program, a first copy of the formed signature being transmitted to the failsafe programmable logic controller and being stored in the failsafe programmable logic controller, and a second copy of the formed signature being stored in an external component;

transmitting the first copy of the formed signature to the external component and comparing the transmitted first copy of the formed signature with the second copy of the formed signature by a second comparison after at least one of the application program and the first copy of the formed signature is transmitted to the failsafe programmable logic controller;

determining, as an actual value, a second signature from one of the application program in the main memory and the plurality of the program modules transmitted to the main memory by a management entity of the failsafe programmable logic controller;

comparing the determined second signature with the first copy of the formed signature by a first comparison of the programmable logic controller; and changing the programmable logic controller to a safe operating state in an event of at least one of a discrepancy in the first comparison and a discrepancy in the second comparison;

wherein the second signature determined as the actual value is transmitted to the external component, a device of the external component performing a further comparison with the second copy of the signature stored in the device as the desired value, operation of the application program in the programmable logic controller being enabled in an event of a positive result of the further comparison.

2. The method as claimed in patent claim 1, wherein execution of the application program in the main memory is prevented or the application program is stopped to change the programmable logic controller to the safe operating state.

3. The method as claimed in claim 1, wherein the determination of the signature used as the actual value and the first comparison with the second signature are performed before the application program is started.

4. The method as claimed in claim 1, wherein one of the signature and the first and second copies of the formed signatures used as desired values are calculated when creating the application program.

5. The method as claimed in claim 1, wherein the first and second copy of the formed signatures used as the actual value and as the desired value are each formed from one of properties and signatures of individual program modules of the plurality of program modules.

6. The method as claimed in claim 1, wherein the second signature used as the actual value is determined from all program modules of the plurality of program modules one of in the main memory and transmitted to the main memory during a loading process.

7. The method as claimed in claim 1, wherein verification by determining the actual value of the signature and by comparing the signature with the first copy of the formed signature stored as the desired value is repeatedly performed during operation of the programmable logic controller.

8. The method as claimed in claim 1, wherein the external component comprises one of a development system and an engineering system for creating the application program.

9. The method as claimed in claim 1, wherein the external component comprises one of a safety server and a load server of an industrial automation.

\* \* \* \* \*